United States Patent [19]

Gilchrist

[11] 3,898,960

[45] Aug. 12, 1975

[54] APPARATUS FOR FEEDING ANIMALS

[76] Inventor: Timothy Michael Gilchrist, Marvis Bank, Newrath, Waterford, Waterford County, Ireland

[22] Filed: Nov. 19, 1973

[21] Appl. No.: 417,093

[30] Foreign Application Priority Data

Nov. 18, 1972 Ireland................................ 1406/72

[52] U.S. Cl................................ 119/51 R; 119/63
[51] Int. Cl............................................. A01k 5/00
[58] Field of Search............ 119/51 R, 51.11, 51.12, 119/52 AF, 59, 63

[56] References Cited
UNITED STATES PATENTS

| 945,242 | 1/1910 | Merrill.................................. 119/63 |
| 3,265,036 | 8/1966 | Kloss............................ 119/51.11 X |
| 3,333,573 | 8/1967 | Wotring....................... 119/51.11 X |

Primary Examiner—Hugh R. Chamblee
Attorney, Agent, or Firm—Holman & Stern

[57] ABSTRACT

An animal feeding device is provided with an open topped trough and a lid for sealing the trough. A feed slurry can be introduced into the trough water under pressure when the lid is closed. The lid is then opened to allow feeding animals access thereto.

5 Claims, 2 Drawing Figures

APPARATUS FOR FEEDING ANIMALS

BACKGROUND OF THE INVENTION

Introduction

The present invention relates to an animal feeding device and in particular to an animal feeding device suitable for use with a feed slurry of a relatively low liquid/solid ratio.

Field of the Invention

In German Pat. Specification No. 1195546, there is described an apparatus for the delivery of liquid feed to animals. The device supplies liquid food through suction and pressure pipes arranged above a feeding trough and provided with closable outlets opening into the feeding trough. The problem with such a device is that the control means for dispensing the food from the pipes consists of closing shutters or sluice valves which, because of their construction, tend to encourage food to adhere thereto. A deposit of food forms around the various valves and shutters and as a result of this, the installation has to be cleaned regularly if it is to remain operative. Furthermore, food-boiling bacteria develops in the organic feed which can have very harmful consequences to the health of the feeding animal. Installations of this kind must, therefore, be constantly cleaned and serviced.

It is known to provide a feeding device for animals of the type having a food and water containing portion protected by a cover which is adapted to be moved to the open position by, for example, the weight of the animal. Typical constructions of such feeding devices are described in U.S. Pat. No. 3121419; U.S. Pat. No. 3176658; and British Pat. Specification No. 757500. However, such feeding devices are used merely to ensure that the feeding stuff contained within the trough is shielded against the intrusion of dirt, rain, insects, small rodents and other infection carrying animals.

One of the problems associated with the feeding of pigs is that it is vital to give the pigs a wet feed. Where pigs have been given a dry feed, the pigs usually scatter the feed with resultant wastage and the raising of dust. Pigs are particularly susceptible to pneumonia and a dusty atmosphere tends to give them pneumonia. This leads to a fairly high mortality rate among the pigs, generally making it imperative not to use a dry feed with pigs. Unfortunately one of the problems with a wet feed for pigs is that any mechanical method used to deliver a slurry of wet food to the pigs suffers from the disadvantage that in order to make the slurry of wet pig feed sufficiently fluid to facilitate its flow, it is necessary to add a considerable amount of water or other moisture such as skimmed milk or whey to the feed. Thus the liquid/solid ratio of the slurry has heretofore been relatively high. Unfortunately, when pigs are below about 70 lbs. weight, that is to say, when the pigs are aged below 2 months, this high liquid/solid ratio has been too high for the efficient feeding of the pigs. It is, therefore, important to feed young pigs with a slurry of a lower liquid/solid ratio than has heretofore been possible. Similar problems occur with other young animals.

Objects.

The present invention is directed towards providing an improved construction of an animal feeding device.

Another object of the invention is to provide an animal device which can be used with a feeding slurry of a relatively low liquid/solid ratio.

A further object of the invention is to provide an animal feeding device that can be relatively easily in-place cleaned. Still another object of the invention is to provide an efficient method of feeding animals.

SUMMARY OF THE INVENTION

This invention provides an animal feeding device comprising:
an open topped trough;
a lid for sealing the trough; and
means for introducing under pressure
a feed slurry into the trough.

The above and other objects and advantages of this invention will become apparent from the following detailed description in connection with the accompanying drawings.

DETAILED DESCRIPTION OF THE INVENTION

Figure 1:
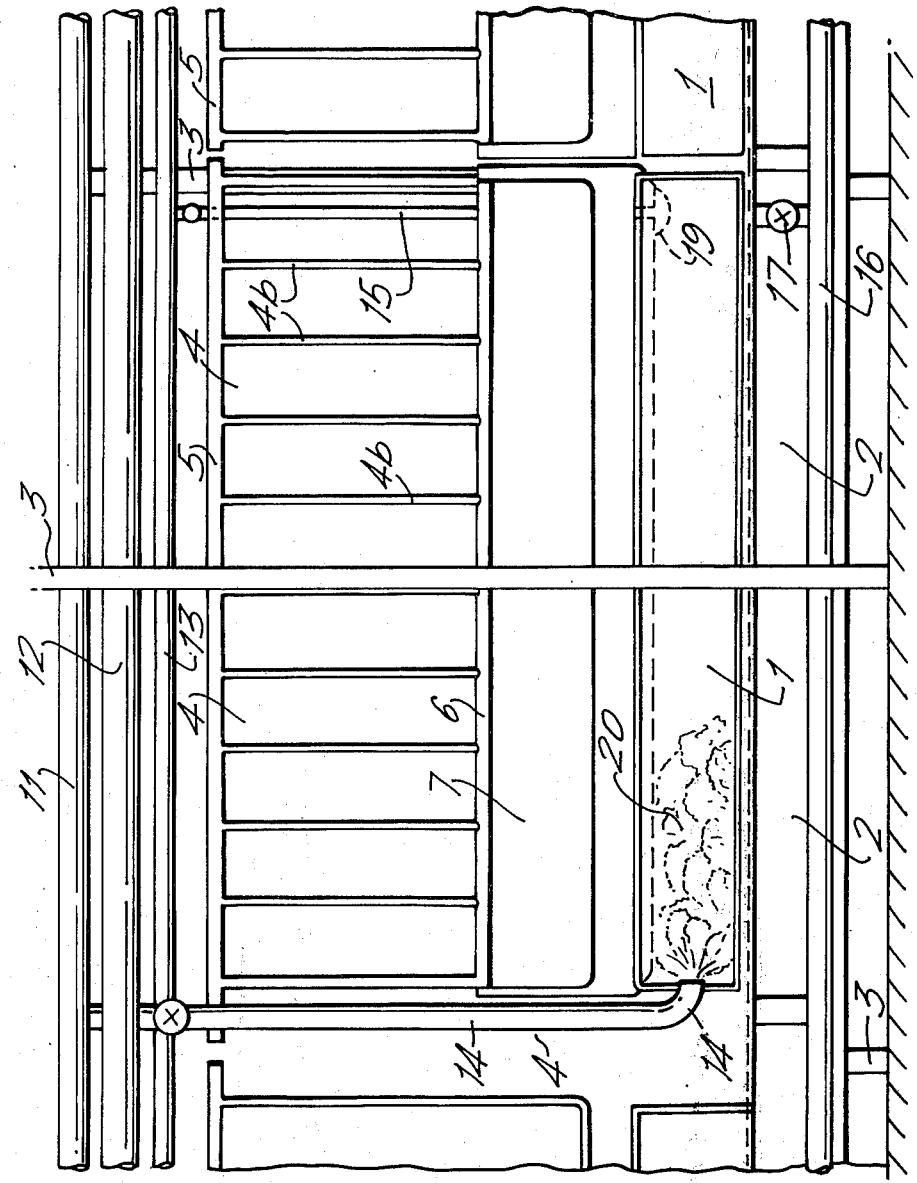
FIG. 1 is a front view of an assembly of feeding troughs according to the invention.

Referring to the drawings there is illustrated a series of open animal feeding troughs 1 mounted on a floor 2 of a structure 3.

A side, indicated generally by the reference numeral 4, formed from a number of bars namely a bottom bar 4a, side bars 4b and a top bar 5 is pivotally mounted by means of the top bar 5 on the structure 3. The side 4 is provided with a rib 6 formed from a length of mild steel plate. A lid 7 is pivotally mounted at 8 on the trough 1. The lid 7 is provided with a rubber seal 9 adapted, in use, to engage upper edge 10 of the open trough 1. The lid 7 engages the bottom bar 4a of the side 4 by means of a cranked bar 7a on the lid 7. Pivotal movement of the side 4 is controlled by a conventional pneumatic ram, not shown. The side 4 pivots from the open position shown, to the closed position shown by the interrupted lines in FIG. 2; as the side 4 pivots into this position, the lid 7 is constrained to pivot downwards into the closed position as shown by the interrupted lines in FIG. 2.

A water and/or steam supply pipe, hereinafter referred to as a water pipe 11, a feed slurry pipe 12 and a vacuum pipe 13 are provided. The water pipe 11 and the feed slurry pipe 12 are adapted, in a conventional manner, to feed into an inlet pipe 14 mounted in one end of the trough 1. The vacuum pipe 13 is connected by flexible tubing 15 through the door 4 and lid 7 to a valve 19 in the interior of the trough 1. The valve 19 is a normally open valve of simple construction. The valve 19 is maintained in the open position by gravity. A drain pipe 16 is mounted below the trough 1 and connected thereto by a feed-off pipe 17.

A pump and slurry container both not shown are provided; the pump, slurry container, feed slurry pipe 12, the drain pipe 16, the feed-off pipe 17, and the trough 1 together form a closed circuit.

Figure 2:
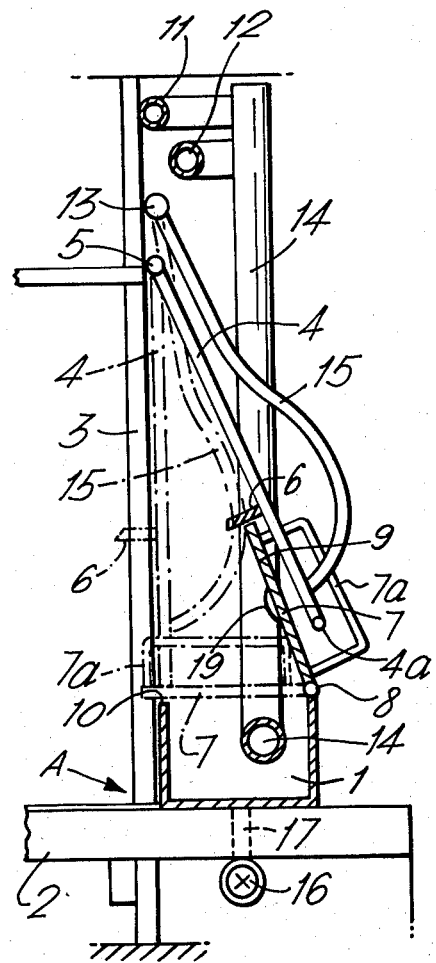
FIG. 2 is a side cross-section view of the apparatus illustrated in FIG. 1, with some sectional lines being omitted for clarity.

In operation, a pressurized feed slurry with a relatively low liquid/solid ratio, hereinafter referred to as a feed slurry 20 is fed through the feed slurry pipe 12 and the inlet pipe 14 into the trough 1 which has been closed, that is to say the side 4 and the lid 7 are in the position illustrated by the interrupted lines in FIG. 2. A vacuum is created on the trough 1. The feed slurry 20 is driven under pressure through the pipe 14 along the trough 1 and since the lid 7 of the trough 1 is closed, the feed slurry 20 will progress down the trough 1 until it fills the complete trough 1. The feed slurry 20 impinges against the valve 19 and closes it. When the trough 1 is filled, the side 4 is opened and the lid 7 is raised, and the pigs in the position indicated by the arrow A can now gain access to the trough 1 for feeding.

When the pigs have been fed, the side 4 and hence the lid 7 are closed and water introduced into the trough 1 to wash away any feed slurry 20 into the feed-off pipe 17 and the drain pipe 16. The feed slurry 20 may thus be collected for recycling and subsequent delivery into the trough 1. Without the weight of feed slurry 20 to keep it closed, the valve 19 opens and any feed slurry 20 adhering to the valve 19 is washed away.

When any surplus feed slurry 20 has been collected, hot water or steam is introduced through the water pipe 11 and the inlet pipe 14 into the trough 1 to clean it. Sterilizing and/or detergent liquid may also be used to thoroughly clean the trough 1.

It will be appreciated that the side 4 prevents the pigs attacking or in any way damaging the lid 7 when in the closed position.

An alternative construction of animal feeding trough is envisaged where the cleansing water is delivered through the feed slurry pipe.

The above embodiment describes a construction of pig feeding trough which may be readily adapted for feeding other animals.

I claim:

1. An animal feeding device comprising of an open-topped trough, means for introducing under pressure a feed slurry into the trough, means for introducing a liquid under pressure into the trough, and a lid movable to a position for closing and sealing the trough in a pressure type manner when feed slurry or liquid under pressure is introduced into the trough.

2. An animal feeding device as recited in claim 1 in which the lid is pivotally mounted on the trough and engages a side pivotally suspended above the opening edge of the lid, the said guard door being provided with means to pivot it over the trough thus pivoting the lid into the open position.

3. An animal feeding device as recited in claim 2 in which the means for introducing feed slurry into the trough comprises a pump and slurry container connected by means of pipes to form a closed circuit with the trough.

4. An animal feeding device as recited in claim 1 in which the means for introducing feed slurry into the trough comprises a pump and a slurry container connected by means of pipes to form a closed circuit with the trough.

5. An animal feeding device comprising a trough having an opened top, a lid movable from a first position away from the opened top to a second position closing the opened top, means operably connected to the lid and operable in the second position to seal the trough in a pressure type manner, means for introducing under pressure a feed slurry into the trough, means for introducing a liquid under pressure into the trough, and a exhaust air conduit and valve associated with the trough.

* * * * *